United States Patent
Ito

Patent Number: 6,006,707
Date of Patent: Dec. 28, 1999

[54] VALVE TIMING CONTROL APPARATUS FOR AN INTERNAL COMBUSTION ENGINE

[75] Inventor: Tokiji Ito, Toyota, Japan

[73] Assignee: Toyota Jidosha Kabushiki Kaisha, Aichi-ken, Japan

[21] Appl. No.: 09/121,553

[22] Filed: Jul. 23, 1998

[30] Foreign Application Priority Data

Jul. 30, 1997 [JP] Japan ..................................... 9-204559

[51] Int. Cl.⁶ .............................. F01L 1/34; F02D 13/02
[52] U.S. Cl. ................................. 123/90.15; 123/90.17; 73/116; 73/117.3
[58] Field of Search ........................... 123/90.15, 90.16, 123/90.17, 90.18, 90.31; 73/116, 117.2, 117.3, 118.1

[56] References Cited

U.S. PATENT DOCUMENTS

| | | | |
|---|---|---|---|
| 4,996,954 | 3/1991 | Seki et al. | 123/90.16 |
| 5,033,290 | 7/1991 | Seki et al. | 73/118.1 |
| 5,529,034 | 6/1996 | Sone et al. | 123/90.17 |
| 5,537,961 | 7/1996 | Shigeru et al. | 123/90.15 |
| 5,626,108 | 5/1997 | Kato et al. | 123/90.15 |
| 5,644,073 | 7/1997 | Matsuno et al. | 73/118.1 |
| 5,738,053 | 4/1998 | Kato | 123/90.15 |

FOREIGN PATENT DOCUMENTS

59-105911  6/1984  Japan.

*Primary Examiner*—Weilun Lo
*Attorney, Agent, or Firm*—Kenyon & Kenyon

[57] ABSTRACT

An apparatus for detecting abnormalities in a valve timing control apparatus comprises a variable valve timing control mechanism that controls a valve timing of an internal combustion engine through a controlled supply of oil via an oil control valve, means for detecting deviation between a target valve timing and an actual valve timing, means for detecting an amount of change of the actual valve timing, means for force-driving the oil control valve and means for judging that an abnormality has occurred in the valve timing control apparatus based on detection, after the oil control valve has been force driven, of an abnormal deviation between the target valve timing and the actual valve timing and an abnormal amount of change of the actual valve timing.

17 Claims, 11 Drawing Sheets

VALVE TIMING CONTROL APPARATUS FOR AN INTERNAL COMBUSTION ENGINE

INCORPORATION BY REFERENCE

The disclosure of Japanese Application No. HEI 9-204559 filed on Jul. 30, 1997 including the specification, drawings and abstract incorporation herein by reference in its entirety.

FIELD OF THE INVENTION

The present invention relates to an apparatus for detecting abnormalities in a valve timing controlling apparatus of an internal combustion engine, capable of detecting abnormalities of a valve timing control apparatus controlling at least either intake valves or exhaust valves of an internal combustion engine depending on operating conditions thereof.

BACKGROUND OF THE INVENTION

Continuously variable valve timing mechanisms to control either intake valves, exhaust valves, or both, depending on operating conditions of the engine have been known. One known variable timing mechanism is a variable valve timing mechanism that continuously displaces the rotary phase difference (displacement angle) of a camshaft relative to the crankshaft.

On an engine equipped with such a variable valve timing mechanism, the actual rotary phase difference (actual displacement angle) is made to converge toward a target rotary phase determined from operating conditions of the engine using a feedback control system. Therefore, it is necessary for such an apparatus to accurately detect the actual displacement angle using a phase difference detection device as disclosed in Japanese Patent Application No. SHO 59-105911. This publication describes an apparatus for accurately detecting actual displacement angles by measuring a gap between a first pulse signal emitted at each rotation of the crankshaft and a second pulse signal emitted at each rotation of a camshaft.

If an abnormality occurs in the variable valve timing mechanism, e.g., when an odd object is trapped in the mechanism, it is impossible to make the actual displacement angle converge toward the target displacement angle, thus deteriorating the engine power output when various controlled parameters of the engine such as the timing of fuel injection are determined depending on the target displacement angle. Therefore, it is generally necessary to monitor whether any abnormality is occurring in a variable valve timing mechanism and to correct those controlled parameters to prevent the deterioration of the engine output when an abnormality occurs.

Abnormalities may be detected by comparing an absolute value of a difference between the target displacement angle and the actual displacement angle to a predetermined threshold value. When the absolute value of the difference exceeds the threshold value, an abnormality is determined to exist.

However, detecting abnormalities based solely on the comparison of the absolute value of the difference between the target displacement angle and the actual displacement angle to a predetermined threshold value tends to produce misjudgments. Such misjudgments may result because the absolute value of the deviation between the target displacement angle and the actual displacement angle may be quite large in an early stage of the control, as the actual displacement angle is displaced to follow the target displacement angle in that stage.

As a consequence, Japanese Patent Application No. HEI 8-232617 describes a device designed to avoid such erroneous detection of abnormalities. This apparatus attempts to avoid erroneous detection of abnormalities by setting up a judgment time in abnormality detection as it compares the actual displacement angle with the threshold value in detecting abnormalities.

A typical abnormality that can occur in a valve timing control apparatus is an abnormality caused by small metal particles that clog the valve timing control apparatus. However, such abnormalities sometimes disappear after a time through normal operation of the valve timing control apparatus without recourse to any remedial actions. For example, if the valve timing control apparatus uses hydraulic pressure for the purpose of control, such metal particles can be removed by the oil flow in the course of its natural operation.

A problem with the aforementioned apparatus is that abnormalities which may disappear in the course of natural operation of a valve timing control apparatus may be mistakenly identified as an actual problem, thus reducing the reliability of the abnormality detection apparatus.

SUMMARY OF THE INVENTION

The present invention is directed to an apparatus for detecting abnormalities in a valve timing control apparatus comprising a variable valve timing control mechanism that controls a valve timing of an internal combustion engine through a controlled supply of oil via an oil control valve, means for detecting deviation between a target valve timing and an actual valve timing, means for detecting an amount of change of the actual valve timing, means for force-driving the oil control valve, and means for judging that an abnormality has occurred in the valve timing control apparatus based on detection, after the oil control valve has been force driven, of an abnormal deviation between the target valve timing and the actual valve timing and an abnormal amount of change of the actual valve timing.

According to a second aspect of the present invention, the oil control valve is force-driven when the condition of the deviation detected between the target valve timing and the actual valve timing is abnormal and, at the same time, the condition of the change amount of the detected actual valve timing is also abnormal.

In the above-mentioned construction, the oil control valve is force-driven when the condition of the deviation detected between the target valve timing and the actual valve timing is abnormal and, at the same time, the condition of the change amount of the detected actual valve timing is also abnormal. Moreover, a judgment is made whether any abnormality exists in the valve timing control apparatus after the oil control valve is force-driven. Therefore, the abnormality detection will be performed avoiding those causes that can be eliminated by force-driving the oil control valve, thus providing a means of detecting abnormalities of a valve timing control apparatus with higher reliability.

A third aspect of the present invention intending to achieve the object provides an apparatus for detecting abnormalities of a valve timing control apparatus characterized by comprising: a variable valve timing mechanism that variably controls the valve timing of an internal combustion engine by controlling oil flow with an oil control valve; a deviation detection means that detects the deviation between the target valve timing and the actual valve timing regarding the valve timing; a change amount detection means that detects the amount of change of the actual valve timing; a judgment means that judges abnormalities of the valve timing control apparatus based on whether the condition of the deviation detected between the target valve timing and the actual valve timing is abnormal and, at the same time, the condition of the change amount of the detected actual valve timing is also abnormal; and a force-driving means that force-drives the oil control valve when an abnormality of the valve timing control apparatus is detected by the judgment means.

In the above-mentioned construction, the oil control valve is force-driven when the condition of the deviation detected between the target valve timing and the actual valve timing is abnormal and, at the same time, the condition of the change amount of the detected actual valve timing is also abnormal. Therefore, the abnormality detection will be performed avoiding those causes that can be eliminated by force-driving the oil control valve.

A fourth aspect of the present invention intending to achieve the object is characterized in that, in the apparatuses of the first through third aspects of the present invention, the force-driving means or the judgment means determines the deviation condition abnormality based on the fact that the deviation detected between the target valve timing and the actual valve timing is and continues to be above a predetermined value continually for a predetermined length of time, and the amount of change condition abnormality based on the fact that the amount of change of the detected actual valve timing is and continues to be below a predetermined value for a predetermined period of time.

In the above-mentioned construction, the abnormality judgment of a valve timing control apparatus is based on detecting the conditions of deviation between the target valve timing and the actual valve timing and of the change amount of the actual valve timing as well as the period of times these conditions are maintained. Therefore, it can avoid erroneous judgments in judging abnormalities, thus providing a more reliable means of detecting abnormalities of a valve timing control apparatus.

DETAILED DESCRIPTION OF PREFERRED EMBODIMENTS

The apparatus according to the present invention for detecting abnormalities in a valve timing control apparatus will be described below referring to FIGS. 1 through 12 showing an embodiment applied to a gasoline engine.

Figure 1:
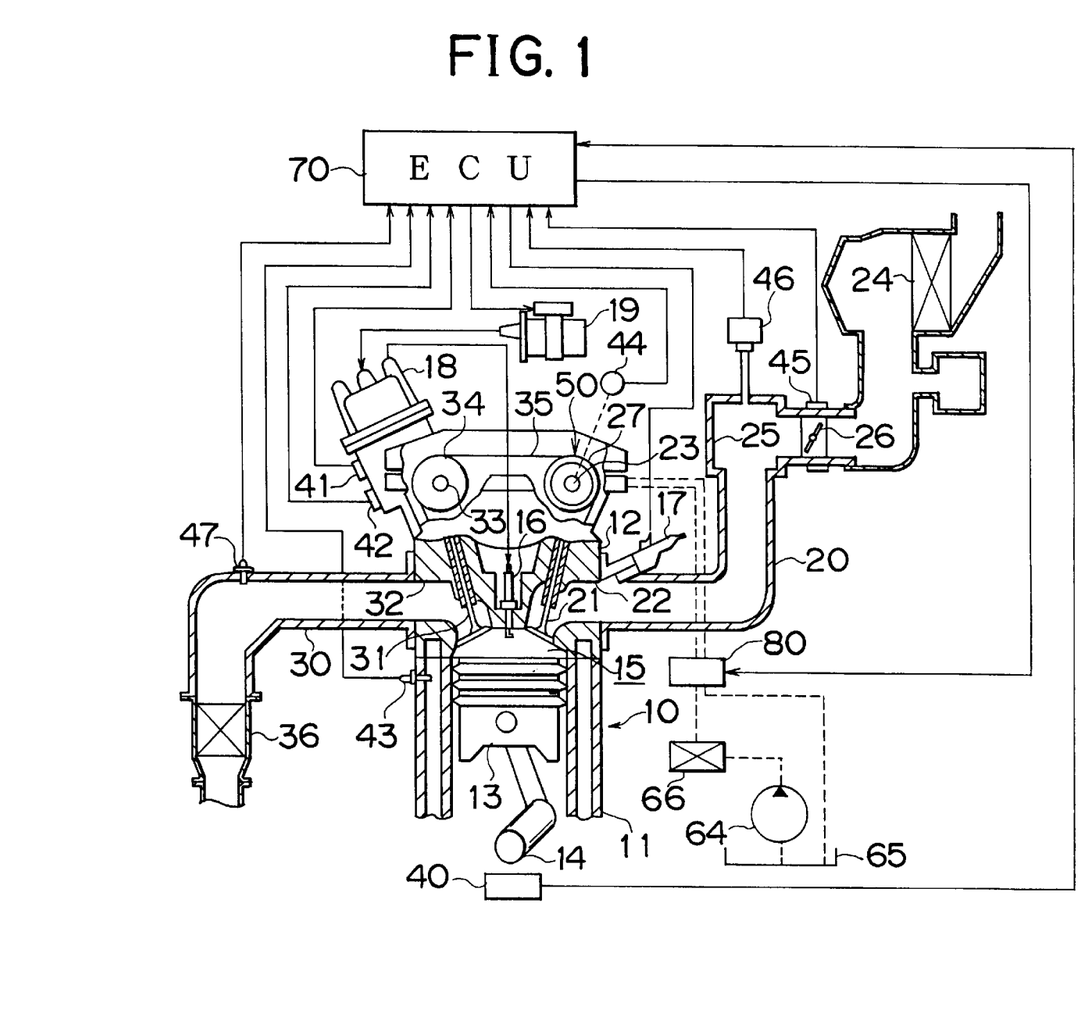
FIG. 1 shows general construction diagram of a gasoline engine to which the present invention is applied.

The construction of an apparatus according to the present invention for detecting abnormalities of a valve timing control apparatus will be described below referring to FIG. 1 and FIG. 2. As shown in FIG. 1, the apparatus includes a gasoline engine 10 comprising a cylinder block 11 wherein multiple cylinders are formed, a cylinder head 12 connected to the top of the cylinder block 11, and pistons 13, each of which reciprocates vertically inside each cylinder of the cylinder block 11. The bottom end of each piston 13 is connected to a crankshaft 14, and the crankshaft 14 rotates as the piston reciprocates vertically.

A crank angle sensor 40 provided in the vicinity of the crankshaft 14 comprises a magnetic rotor (not shown) connected to the crankshaft 14 and an electromagnetic pickup (not shown). The outer periphery of the rotor is provided with multiple gear teeth formed at a constant angle interval, and a pulse-like crank angle signal will be generated each time one of the gear teeth of the rotor passes by the electromagnetic pickup.

The rotary angle of the crankshaft 14 (crank angle) is detected by counting the number of crank angle signals from the crank angle sensor 40 after a reference position signal is generated by a cylinder identifying sensor 42 to be discussed later.

Each space defined by the inner walls of the cylinder block 11 and the cylinder head 12, and the top of each piston 13 serves as a combustion chamber 15 wherein the fuel-air mixture is combusted, and a spark plug 16 is provided protruding into the combustion chamber 15 at the top of the cylinder head 12.

Each sparkplug 16 is connected to a distributor 18 via plug cord and the like, so that a high voltage from an igniter 19 is distributed by the distributor 18 to each sparkplug 16 synchronized with the crank angle.

The distributor 18 is provided with an engine RPM sensor 41 that detects the RPM of the crankshaft 14 by connecting to the exhaust camshaft 33.

The engine speed sensor 41 comprises a magnetic rotor (not shown) which rotates synchronously with the crankshaft 14, and an electromagnetic pickup (not shown), wherein the electromagnetic pickup detects the rotor RPM and, consequently, the RPM of the crankshaft 14 (i.e., engine speed, NE). The distributor 18 is also equipped with a cylinder identifying sensor 42 that detects the reference position of the crankshaft from the rotor's rotation.

The cylinder block 11 is equipped with a water temperature sensor 43 to detect the temperature of the cooling water (cooling water temperature) THW. The cylinder head 12 is equipped with an intake port 22 and an exhaust port 32, wherein the intake port 22 is connected to an intake passage 20 and the exhaust port 32 is connected to an exhaust passage 30. The intake port 22 of the cylinder head 12 is provided with an intake valve 21 and the exhaust port 32 is provided with an exhaust valve 31.

An intake-side camshaft 23 is provided above the intake valve 21 that opens and closes the intake valve 21, and an exhaust side camshaft 33 is provided on the exhaust valve 31 that opens and closes the exhaust valve 31. A first end of the camshaft 23 is coupled to an intake-side timing pulley 27 while an exhaust side timing pulley 34 is coupled to the first end of the cam shaft 33. Both timing pulleys 27 and 34 are, in turn, connected to the crankshaft via a timing belt 35. (Their methods of connection with the crankshaft 14 are not shown in the drawing.)

Consequently, when the engine 10 operates, rotation of the crankshaft 14 is transmitted via the timing belt 35 and timing pulleys 27 and 34 to the camshafts 23 and 33 respectively, and rotation of the camshafts 23 and 33 causes the intake valve 21 and the exhaust valve 31, respectively, to open and close periodically. The valves 21 and 31 are driven according to a set of predetermined opening/closing timings in synchronization with the rotation of the crankshaft 14 and the reciprocating motion of the piston 13, i.e., in synchronization with a series of the piston's four strokes, namely, the intake, compression, explosion/expansion, and exhaust strokes in the engine 10.

Moreover, a cam angle sensor 44 is provided in the vicinity of the intake-side camshaft 23 in order to detect the valve timing of the intake valve 21, the cam angle sensor 44 comprises a magnetic rotor (not shown) connected to the intake-side camshaft 23 and an electromagnetic pickup (not shown). The outer circumference of the magnetic rotor has multiple gear teeth formed at a constant angle interval, which are used to detect cam angles in the form of pulse signals as the intake camshaft 23 rotates, for example, just before the compression TDC or between BTDC 90 and 30 of a specific cylinder.

On the air intake-side of the intake passage 20, an air cleaner 24 is connected and, in the middle of the intake passage 20, a throttle valve 26 is provided, which is opened and closed in relation to operation of the accelerator pedal (not shown). The open/close adjustment of the throttle valve 26 controls intake air flow.

A throttle sensor 45 is provided in the vicinity of the throttle valve 26 to detect the opening degree of the throttle TA. Moreover, a surge tank 25 is formed on the downstream side of the throttle valve 26 in order to suppress intake air pulsation. The surge tank 125 is provided with an intake pressure sensor 46 in order to detect the intake pressure in the surge tank 25. An injector 17 for supplying fuel to the combustion chamber 15 is provided in the vicinity of the intake port 22 of each cylinder. Each injector 17 includes a solenoid valve that opens when it is energized and receives fuel from a fuel pump (not shown).

When the engine 10 is operating, the intake passage 20 takes in air filtered by the air cleaner 24, and fuel is injected toward the intake port 22 from the injector 17 simultaneous with the air intake. This produces an air-fuel mixture which is sucked into the combustion chamber 15 as the intake valve 21 opens during the intake stroke.

A three-way catalytic converter 36 is provided in the exhaust passage 30 for the purpose of emission control. Also provided in the exhaust passage 30 is an oxygen sensor 47 for detecting an oxygen concentration in the exhaust gas.

In a system according to the format of the present embodiment, a hydraulically driven variable valve timing mechanism (hereinafter called "VVT") 50 is provided in order to change a degree of valve overlap by means of changing the open/close timing of the intake valve 21. The VVT 50 is a mechanism intended to change the valve timing of the intake valve 21 continuously by changing the rotary phase of the intake-side camshaft 23 relative to the rotation of the crankshaft 14 (intake-side timing pulley 27).

Figure 2:
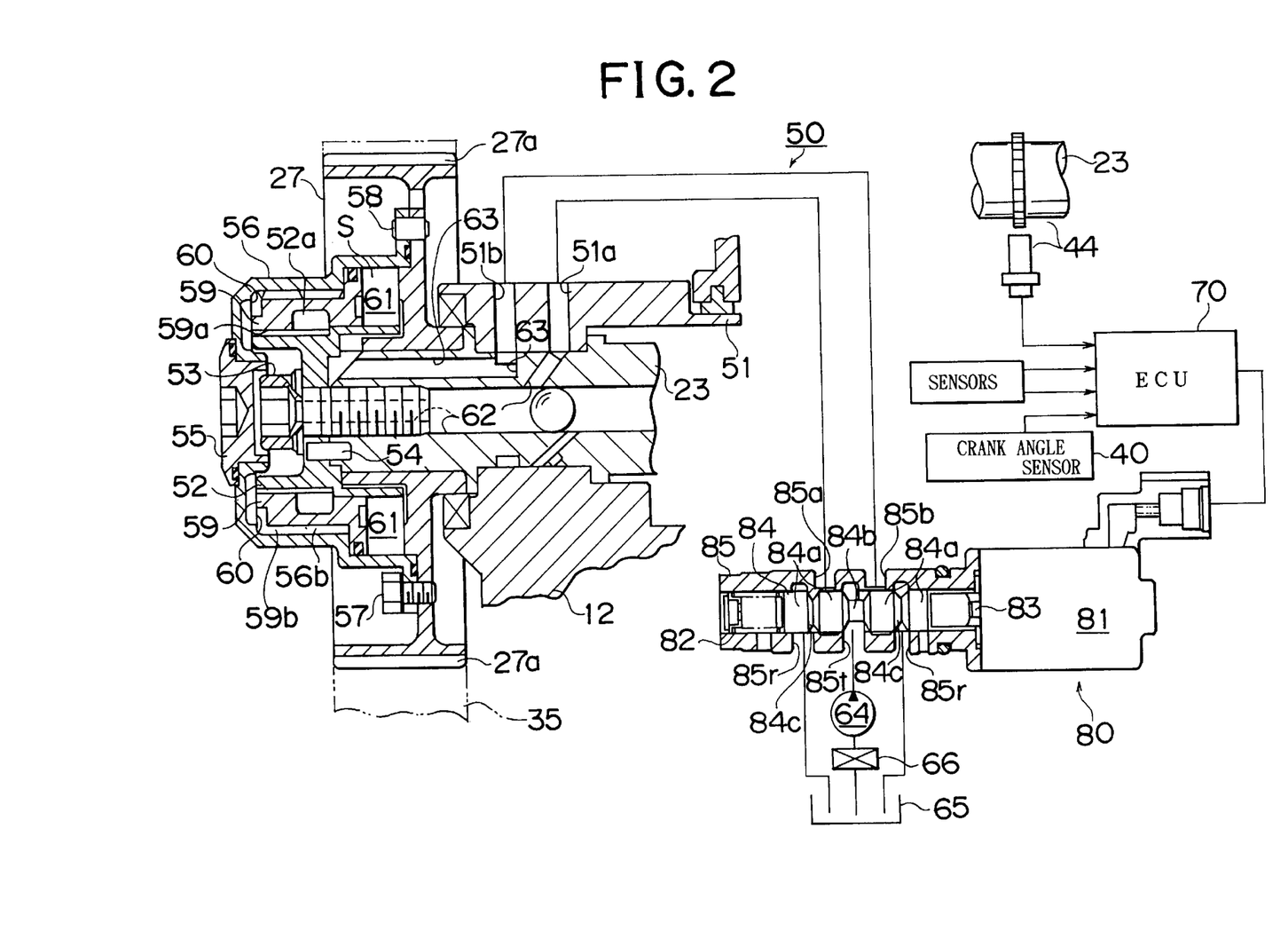
FIG. 2 is a general construction diagram of a an apparatus for variably controlling valve timing mechanism.

FIG. 2 shows the construction of the VVT 50, with FIG. 2 specifically showing a cross section of the vicinity of the intake-side camshaft 23. This valve timing control apparatus comprises the VVT 50, an oil control valve (hereinafter called "OCV") 80 that applies the drive force to the VVT 50, a cam angle sensor 44 that detects the cam angle signal, and an ECU 70 that controls the OCV 80 based on the input signals from various sensors such as the cam angle sensor 44.

The VVT 50 is provided between the intake-side camshaft 23 and the intake-side timing pulley 27, and the intake-side camshaft 23 is supported rotatably between the cylinder head 12 and a bearing cap 51. The intake-side timing pulley 27 is mounted on and rotatable relative to the intake-side camshaft 23 close to the far-end thereof, and an inner cap 52 is mounted on the far-end of the intake-side camshaft 23 via a hollow bolt 53 and a pin 54.

A housing 56 having a cap 55 is mounted on the intake-side timing pulley 27 via bolts 57 and a pin 58 to be able to rotate together, wherein this housing 56 covers the far-end of the intake-side camshaft 23 and the entire inner cap 52. Numerous external gear teeth 27a are formed on the outer periphery of the intake-side timing pulley 27 to engage with the timing belt 35.

The intake-side camshaft 23 and the intake-side timing pulley 27 are connected by a ring gear 59 placed between the housing 56 and the inner cap 52. The ring gear 59 has an annular shape in general and is enclosed in a space S defined by the intake-side timing pulley 27, the housing 56, and the inner cap 52, being freely movable in the axial direction of the intake-side camshaft 23. Also, numerous gear teeth 59a and 59b are formed on both the inner and outer peripheries of the ring gear 59.

In correspondence with them, numerous gear teeth 52a and 56b are formed on the outer periphery of the inner cap 52 and the inner periphery of the housing 56. These teeth 59a, 59b, 52a, and 56b are all helical gear teeth whose tooth traces cross the axis of the intake-side camshaft 23 at a specified angle. The gear teeth 52a mesh with the gear teeth 59a while the gear teeth 56b mesh with the gear teeth 59b, each forming a helical spline.

Because of these meshing pairs, the rotation of the intake-side timing pulley 27 is transmitted to the intake-side camshaft 23 via the housing 56 and the inner cap 52. Moreover, since the gear teeth 59a, 59b, 52a and 56b are all helical gear teeth, a motion of the ring gear 59 in the axial direction of the intake-side camshaft 23 exerting a twisting force to the inner cap 52 and the housing 56, thus causing the camshaft 23 to be displaced relative to the intake-side timing pulley 27.

Within the space S, a first hydraulic chamber 60 is provided at the far-end of the ring gear 59, while a second hydraulic chamber 61 is provided at the near-end of the ring gear 59. The bearing cap 51 is provided with a first hydraulic supply hole 51a and a second hydraulic supply hole 51b, while the intake camshaft 23 has a first hydraulic supply passage 62 that connects the first hydraulic supply hole 51a with the first hydraulic chamber 60 as well as a second hydraulic passage 63 that connects the second supply hole 51b and the second hydraulic chamber 61.

The lubricant oil sucked by a hydraulic pump 64 from an oil pan 65 via an oil filter 66 is supplied to the hydraulic supply holes 51a and 51b with a specified pressure. The OCV 80 is connected to the hydraulic supply holes 51a and 51b in order to supply the hydraulic pressure selectively to the hydraulic chambers 60 and 61 via the hydraulic supply passages 62 and 63.

This OCV 80, which according to this aspect of the invention forms part of the VVT 50, is a 4-port directional control valve that switches the direction of the flow of the lubricant oil by shifting a spool 84 axially and reciprocally with a plunger 83, which is activated by an electromagnetic actuator 81 and a coil spring 82. It also serves to adjust the hydraulic pressures of the hydraulic chambers 60 and 61 by adjusting its opening through duty-control of the electromagnetic actuator 81.

A casing 85 of the OCV 80 comprises a tank port 85*t*, an A-port 85*a*, a B-port 85*b*, and a reservoir port 85*r*. The tank port 85*t* is connected to the oil pan 65 via the hydraulic pump 64, the A-port 85*a* is connected to the first hydraulic supply port 51*a*, and the B-port 85*b* is connected to the second hydraulic supply port 51*b*. The reservoir port 85*r* is connected to the oil pan 65.

The spool 84 is a cylindrical valve member comprising four lands 84*a* that stop the flow of the lubricant oil between the two ports, a passage 84*b* that connects the two ports to allow the flow of the lubricant, and two other passages 84*c*.

In the VVT 50, as the OCV 80 is controlled to move the spool 84 toward the left of the drawing, the passage 84*b* connects the tank port 85*t* with the A-port 85*a*, thus allowing the lubricant oil to be supplied to the first hydraulic supply hole 51*a*. The lubricant oil supplied to the first hydraulic supply hole 51*a* is supplied to the first hydraulic chamber 60 via the first hydraulic supply passage 62, thus allowing the hydraulic pressure to be applied on the far-end of the ring gear 59.

As the same time, the passage 84*c* connects the B-port 85*b* with the reservoir port 85*r*, thus allowing the lubricant oil in the second oil chamber 61 to be discharged to the oil pan 65 via the second hydraulic supply passage 63 and the second hydraulic supply port 51*b*, as well as the B-port 85*b* and the reservoir port 85*r* of the OCV 80.

As a result, the ring gear 59 moves, rotating around its axis, toward the near-end (the right side of the drawing) due to the hydraulic pressure applied to its far-end, exerting a twisting force via the inner cap 52 on the intake-side camshaft 23. This changes the rotary phase of the intake-side camshaft 23 relative to the intake-side timing pulley 27 (crankshaft 14), rotating the intake-side camshaft 23 from the most retarded angle position toward the most advanced angle position and, thus, advancing the valve open timing of the intake valve 21.

The intake valve 21, with the advancement of the valve open timing, opens while the exhaust valve 31 is still opened, enlarging the valve overlap period, or the period wherein both the intake valve 21 and the exhaust valve 31 are open simultaneously. The motion of the ring gear 59 toward the near-end is limited by the contact with the intake-side timing pulley 27, so that the valve open timing of the intake-side valve 21 becomes earliest when the ring gear 59 is in contact with the intake-side timing pulley 27.

On the other hand, as the OCV 80 is controlled to move the spool 84 toward the right side of the drawing, the passage 84*b* connects the tank port 85*t* with the B-port 85*b*, allowing the lubricant oil to be supplied to the second hydraulic supply hole 51*b*. The lubricant oil supplied to the second hydraulic supply hole 51*b* is supplied to the second hydraulic chamber 61 via the second hydraulic supply passage 63, thus applying hydraulic pressure to the near-end of the ring gear 59.

As the same time, the passage 84*c* connects the A-port 85*a* with the reservoir port 85*r*, thus allowing the lubricant oil in the first oil chamber 60 to be discharged to the oil pan 65 via the first hydraulic supply passage 62 and the first hydraulic supply port 51*a*, as well as the A-port 85*a* and the reservoir port 85*r* of the OCV 80.

As a result, the ring gear 59 moves, rotating around its axis, toward the far-end (the left side of the drawing) due to the hydraulic pressure applied to its near-end, exerting a reverse twisting force via the inner cap 52 on the intake-side camshaft 23. This changes the rotary phase of the intake-side camshaft 23 relative to the intake-side timing pulley 27 (crankshaft 14), rotating the intake-side camshaft 23 from the most advanced angle position toward the most retarded angle position and, thus, retarding the valve open timing of the intake valve 21.

The retardation of the valve open timing of the intake valve 21 thus brought about reduces or eliminates the valve overlap period during which both the intake valve 21 and the exhaust valve 31 are open simultaneously. The motion of the ring gear 59 toward the far-end is limited by the abutment of the ring gear 59 against the housing 56, so that the valve open timing of the intake-side valve 21 becomes latest when the ring gear 59 contacts the housing 56.

The valve timing of the intake valve 21, to be adjusted by the VVT 50 as described above is calculated from the cam angle signal provided by the cam angle sensor 44 and the crank angle signal provided by the crank angle sensor 40.

For example, the required displacement angle for the intake-side camshaft 23 relative to the crankshaft 14 can be calculated by measuring the time required for the input of the crank angle signal (reference timing signal) of BTDC 30 after the input of the cam angle signal at the ECU 70 based on the engine RPM, NE, and converting the time to the displacement angle using the known relation between the time and the crank angle.

Figure 3:
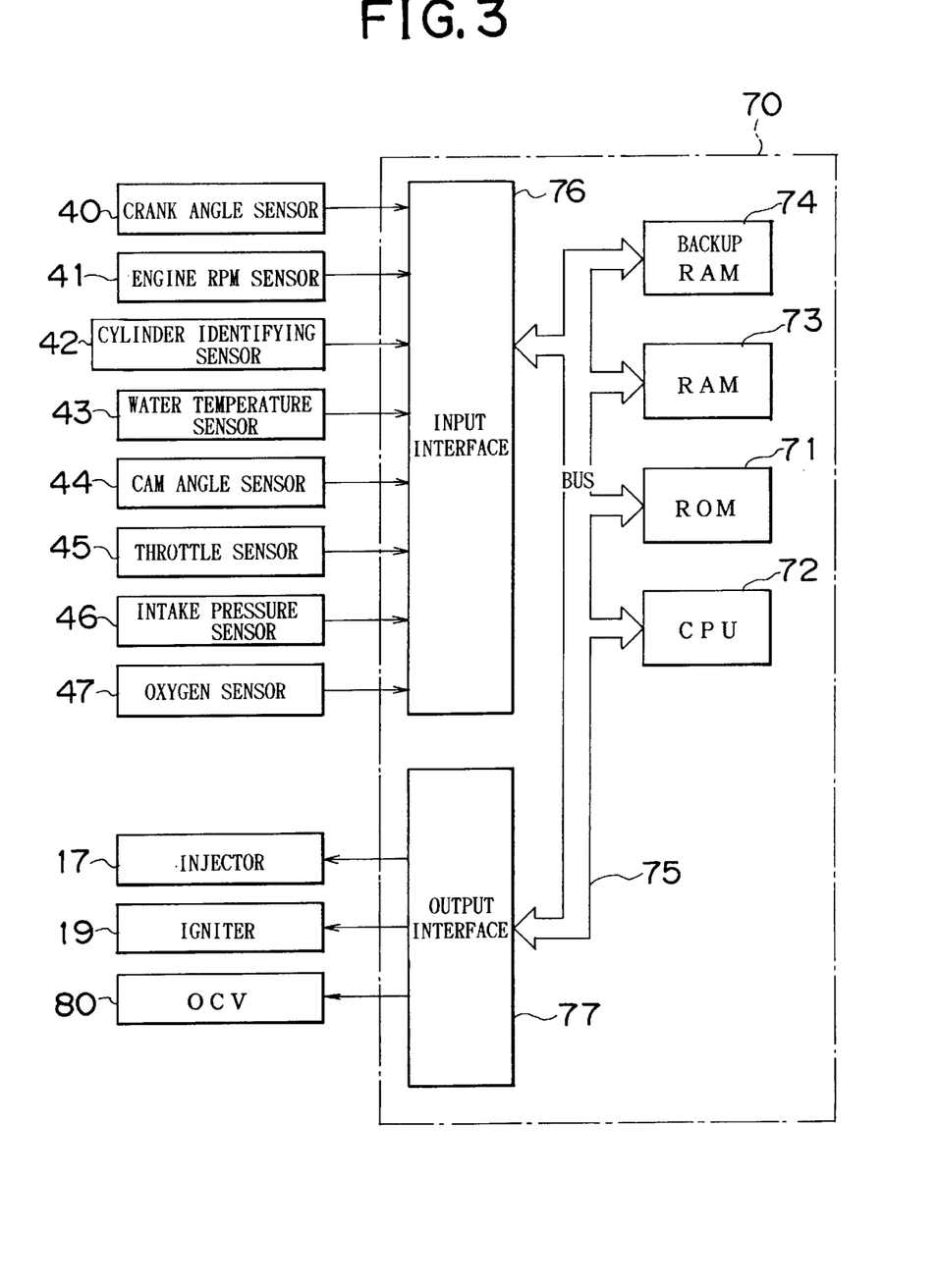
FIG. 3 is a control block diagram for an apparatus for detecting abnormalities in a valve timing control apparatus.

The control system of the apparatus for detecting abnormalities of a valve timing control apparatus will now be described referring to the control block diagram shown in FIG. 3.

The control system for the apparatus for detecting abnormalities of a valve timing control apparatus is constituted around an electronic control unit (hereinafter called "ECU") 70 which contains a ROM 71, in which are stored various programs for detecting abnormalities of a valve timing control apparatus as well as maps for changing valve timing in response to various conditions.

The ECU 70 also includes a CPU 72 for executing arithmetic operations based on the control programs stored in the ROM 71, a RAM 73 for temporarily storing various data received from various sensors as a result of the arithmetic operations at the CPU 72, and a backup RAM 74 for holding various data stored in the RAM 73 when the supply of power is discontinued.

The CPU 72, ROM 71, RAM 73 and backup RAM 74 are connected to each other via a bus 75, and are also connected to an input interface 76 and an output interface 77.

The input interface 76 is connected to the crank angle sensor 40, engine RPM sensor 41, cylinder identifying sensor 42, water temperature sensor 43, cam angle sensor 44, throttle sensor 45, intake pressure sensor 46 and the oxygen sensor 47, etc. If any of these sensors provides an analog signal, it is delivered to a bidirectional bus 75 after being converted to a digital signal by means of an A/D converter (not shown).

The output interface 77 is connected to the injector 17, igniter 19 and the OCV 80, etc. These external circuits are controlled based on the calculation results of the control program executed on the CPU 72.

The abnormality detection procedure of this apparatus will now be described referring to FIGS. 4 through 12.

Figure 4:
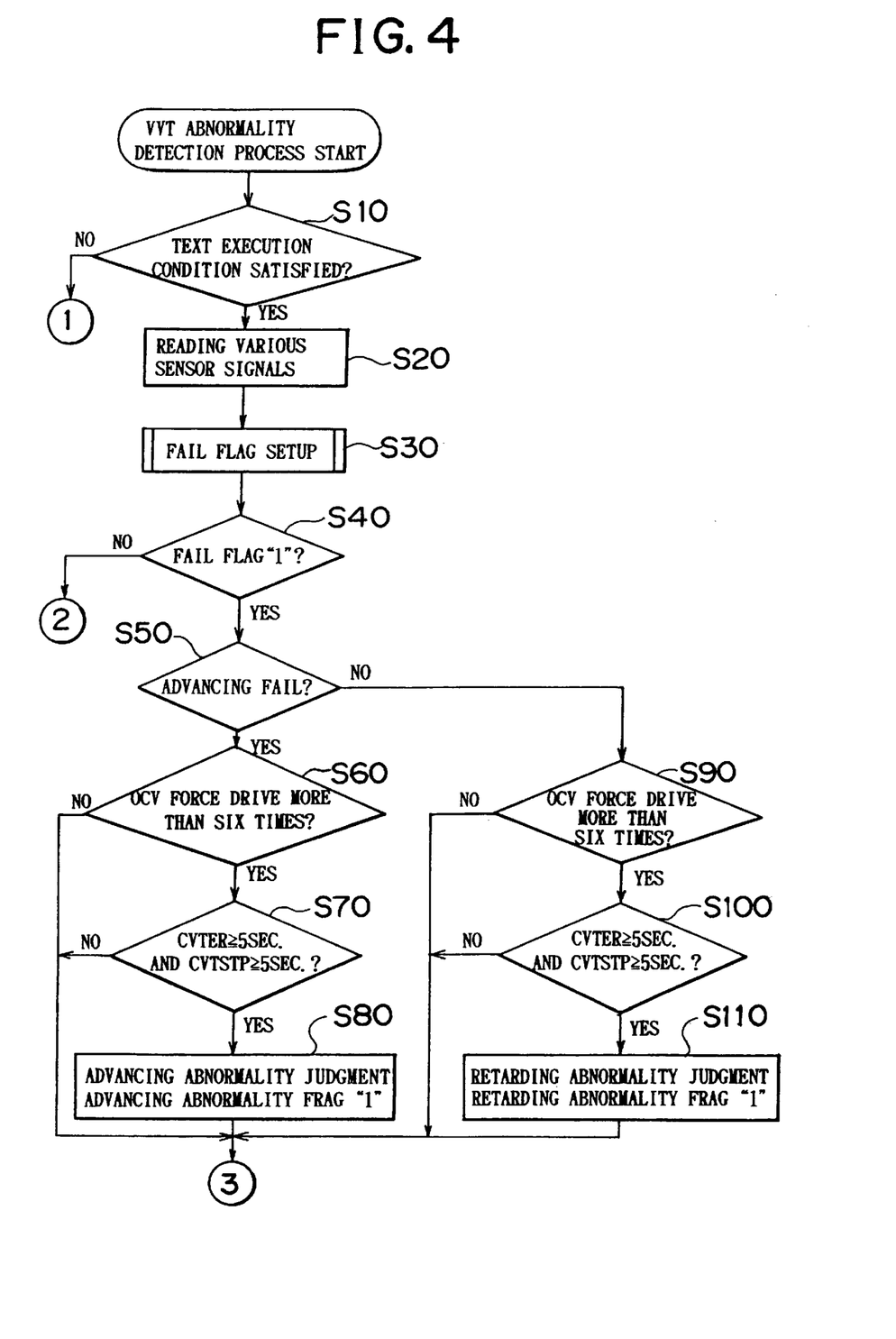
FIG. 4 is a flow chart showing a procedural sequence for detecting VVT abnormalities.
Figure 5:
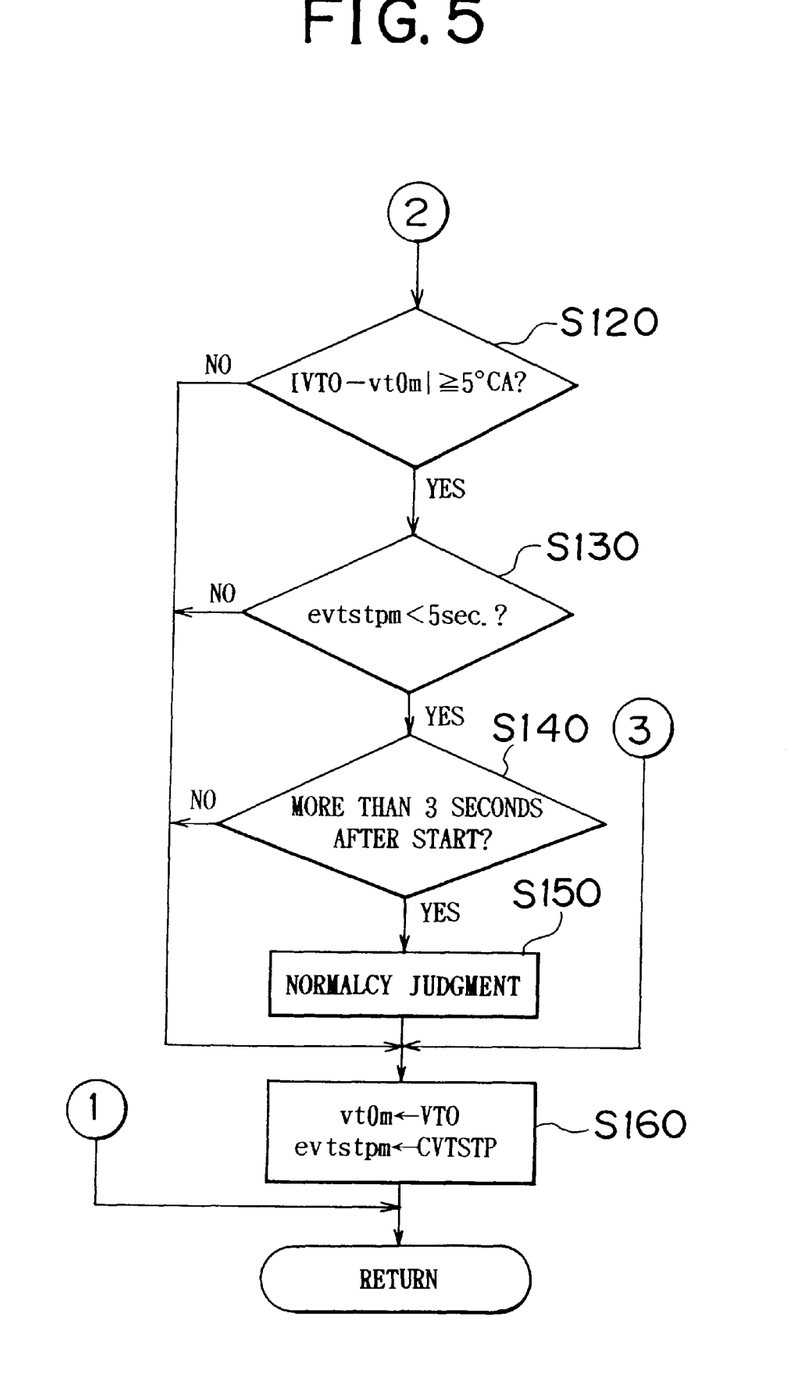
FIG. 5 is another flow chart showing a procedural sequence for detecting VVT abnormalities.
Figure 6:
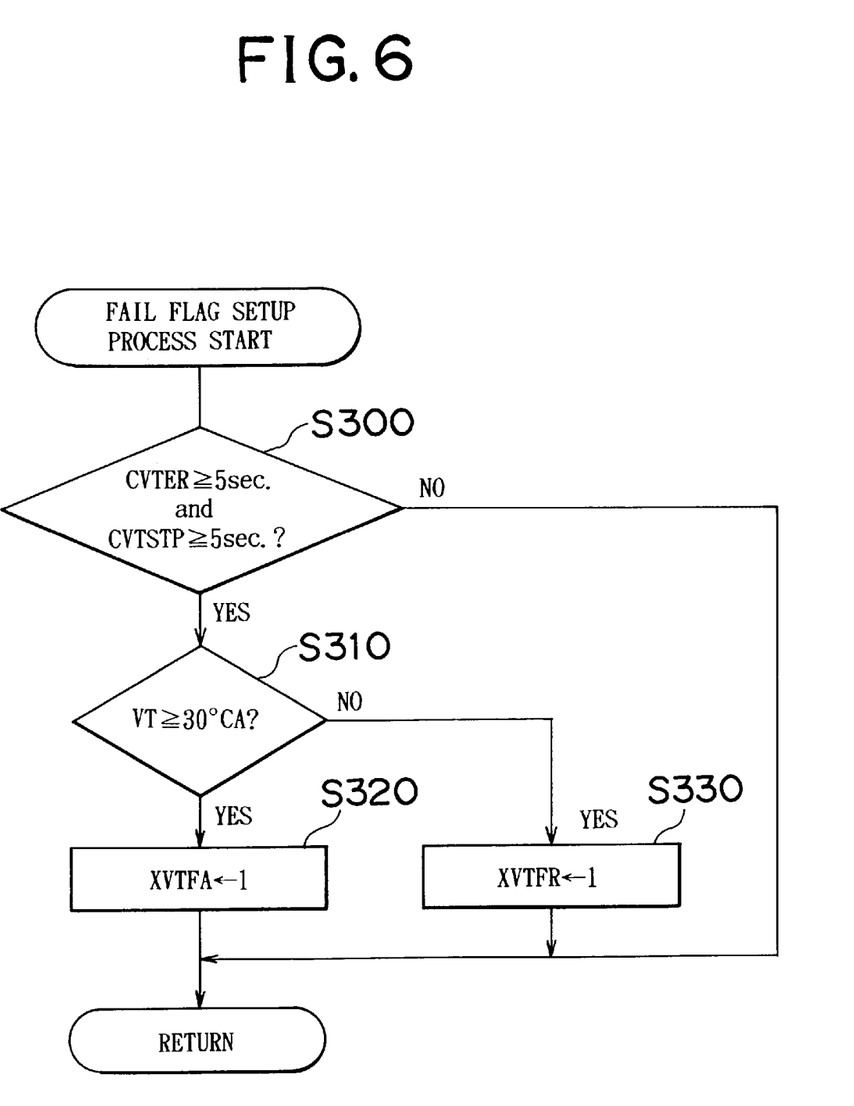
FIG. 6 is another flow chart showing a procedural sequence for detecting VVT abnormalities.

FIGS. 4 through FIG. 6 are flow charts that show the procedure of the "VVT abnormality detection process" to be executed by the CPU 72 in the ECU 70. The program is executed by timed interruption process with an interval of approximately 65 ms (2).

FIGS. 7 through 9 and FIG. 12 show the outlines of the time charts related to the "VVT abnormality detection process."

At step S10 of the flow chart in FIG. 4, a judgment is made on various conditions such as the condition required for executing the "VVT abnormality detection process," for example, whether there is any abnormality in the detection performance of various sensors described above, or whether the battery voltage is sufficient. If it is judged "NO" at step S10, in other words, the above-mentioned conditions are not met, the control will exit the "VVT abnormality detection process" without further executing anything.

On the other hand, if it is judged "YES" at step S10, in other words, the above-mentioned conditions are met, the control moves on to the next step S20, and the CPU 72 will read the detection signals from various sensors including the crank angle sensor 40 and the cam angle sensor 44. It will then proceed to step S30, executing the "fail flag setup process." The "fail flag setup process" at S30 will be explained in reference to the flow chart shown in FIG. 6.

The "fail flag setup process" determines whether a fail condition exists in the VVT 50. If a failure exists, it further determines whether it is an advancement failure or a retardation failure.

First of all, it is determined whether the following inequalities hold:

(3-1) CVTER≧5 sec., and (3-2) CVTSTP≧5 sec.

The CVTER is a counter (hereinafter called "Duration Time Counter") to count the time wherein the absolute value of the deviation between the target displacement angle VTT and the actual displacement angle VT that are applied to the VVT control exceeds 5 CA. Therefore, if a failure exists in the VVT 50 and the actual displacement angle VT has not approached the target displacement angle VTT, the count number of the Duration Time Counter CVTER is increased.

The target displacement angle VTT is a phase displacement angle of the intake-side camshaft 23 relative to the crankshaft 14 which is set up as a target in the VVT control process (feedback control process). The target displacement angle VTT is determined from the operating range of the engine based on the engine RPM, NE, detected by the engine sensor 41, and the intake pressure, PM, detected by the intake pressure sensor 46.

The actual displacement angle VT, which is an actual displacement angle of the intake-side camshaft 23 relative to the crankshaft 14, is calculated based on the crank angle signal (reference timing signal) and the cam angle signal as follows.

First of all, the signal distance (pulse distance) between the time when the cam angle signal detected by the cam angle sensor 44 is received by the ECU 70 and the time when the input of the reference timing signal detected by the crank angle sensor 40 is received by the ECU 70 is measured as a time quantity using the engine RPM, NE. Next, the measured time is converted into an actual displacement angle, VT, applying the known relation between the crank angle and the time (engine RPM, NE).

The CVTSTP is a counter that counts the displacement period when the actual displacement angle VT is changing due to displacement (hereinafter called "Stop Time Counter"), and it will be reset to "0" through the "VT0 updating process" to be described later each time the displacement value VT of the actual displacement angle VT reaches 5 CA. Therefore, if a failure occurs in the VVT 50 and the actual displacement angle VT stops changing, the count of the Stop Time Counter CVTSTP increases. However, this increase of the count of the Stop Time Counter CVTSTP occurs also when the actual displacement angle VT converges on the target displacement angle VTT.

Although the Duration Time Counter CVTER and Stop Time Counter CVTSTP are numerical counters in the actual program, they will be treated as if they are converted into time.

At step S300, it is judged whether both the formulas (3-1) and (3-2) are satisfied, i.e., both the Duration Time Counter CVTER and the Stop Time Counter CVTSFP are larger than 5 seconds, and the control moves to step S310 judging that a failure occurred only when both criteria are met On the other hand, if any of the formulas (3-1) and (3-2) is not satisfied at step S300, it is judged that no failure exists in the VVT 50, and neither the advancement fail flag XVTFA nor the retardation fail flag XVTFR will be set up and the control will exit the "fail flag setup process."

Next, at step S310, it is judged whether the fail that occurred in the VVT 50 is on the advancing or retarding side. For example, if the present actual displacement angle VT is determined to be greater than 30 CA, it is judged that the failure occurred on the advancing side, and the advancement fail flag XVTFA will be set up in the next step S320. In other words, since the actual displacement angle VT is greater than 30 CA, it is judged that the failure occurred at the VVT 50, which happens to be in an advanced condition.

On the other hand, if the present displacement angle VT is determined to be less than 30 CA at step S310, it is judged that the failure occurred on the retarding side, and the retardation fail flag XVTFR will be set up in the next step S330. In other words, since the actual displacement angle VT is less than 30 CA, it is judged that the failure occurred at the VVT 50, which happens to be in a retarded condition.

In both cases described in the above, the advancement fail flag XVTFA and the retardation fail flag XVTFR are reset when the Stop Time Counter CVTSTP is reset to "0."

That completes the "fail flag setup process," and the control returns to the "VVT abnormality detection process," and advances to a step S40 shown in FIG. 4. At step S40, a judgment is made whether a failure exists in the VVT 50, i.e., either the advancement fail flag XVTFA or the retardation fail flag XVTFR is raised. If either flag is raised, the control moves to step S50; if not, it goes to step S120 shown in FIG. 5.

At step S50, it is judged whether the failure at the VVT 50 occurred on the advancing side, i.e., the advancement fail flag XVTFA is raised; if the advancement fail flag XVTFA is raised, it goes to step S60 and those that follow it; if the retardation fail flag XVTFR is raised, it goes to step S90 and those that follow it.

Figure 7:
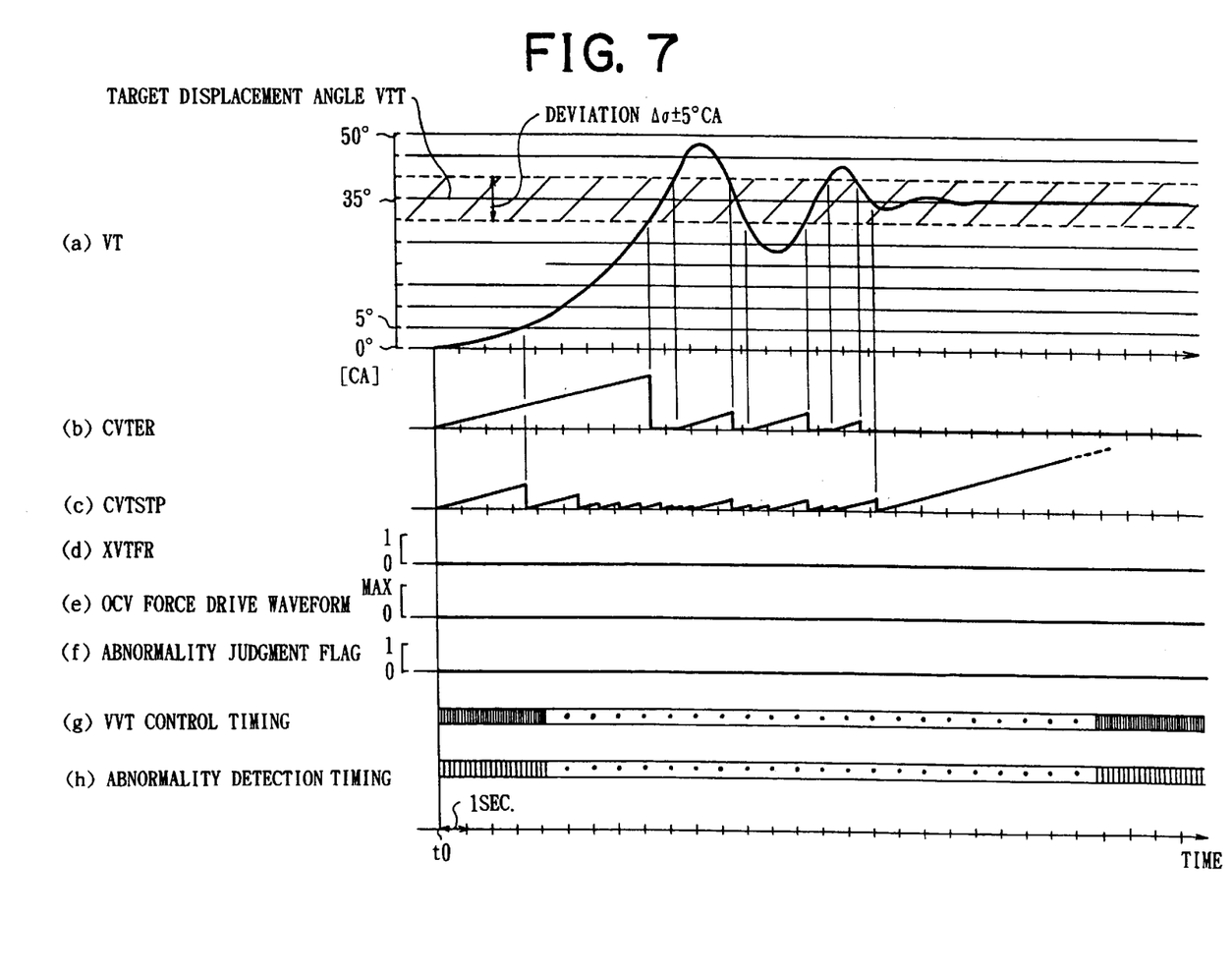
FIG. 7 is a timing chart showing an operating aspect of the embodiment of the present invention.
Figure 8:
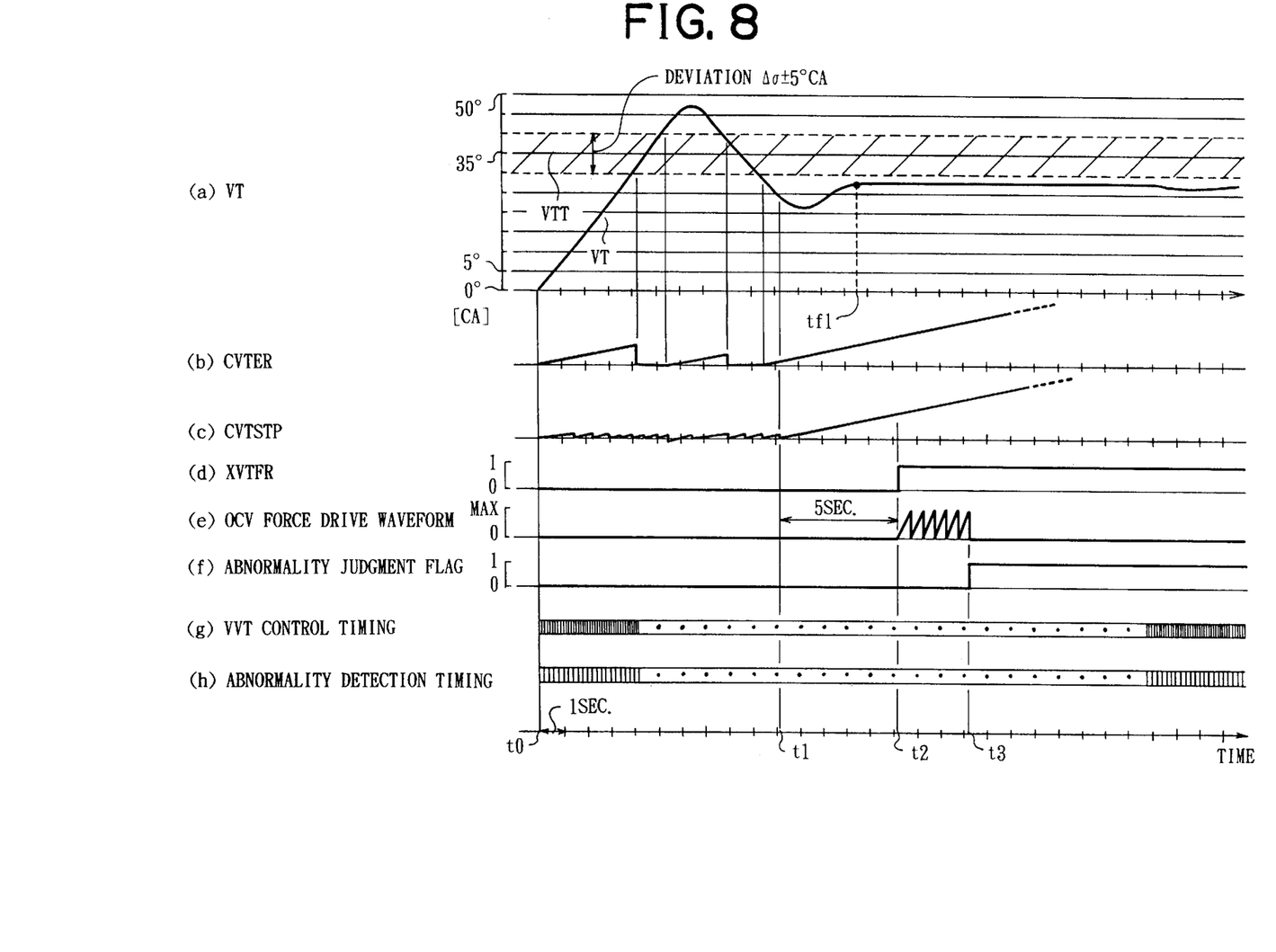
FIG. 8 is a timing chart showing another operating aspect of the present invention.
Figure 9:
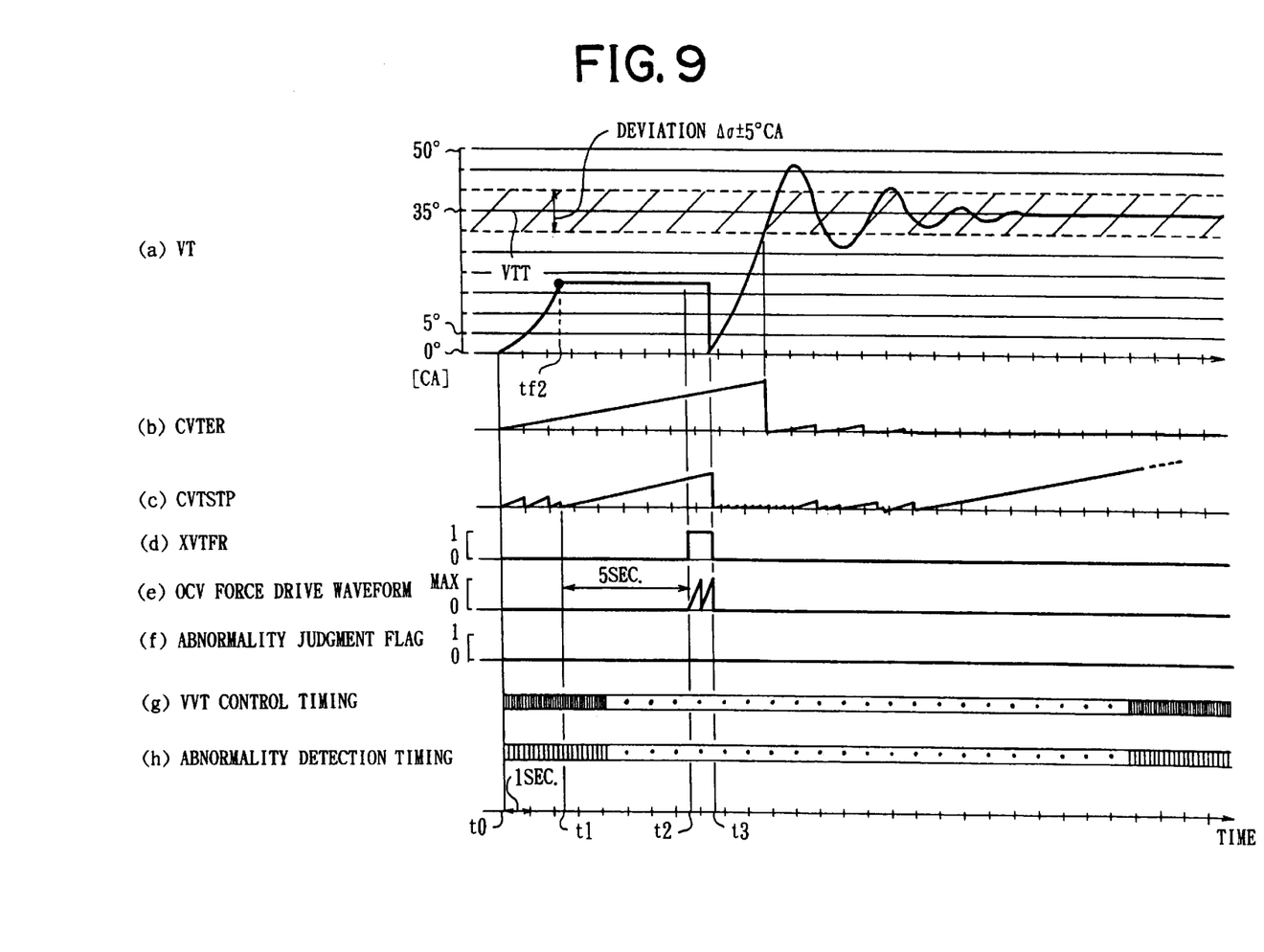
FIG. 9 is a timing chart showing another operating aspect of the present invention.

Since step S60 and step S90 as well as step S100 are essentially the same, the following explanation will deal only with the case where the retarding angle fail flag XVTFR is raised, referring to the time charts related to the "VVT abnormality detection process" shown in FIGS. 7 through FIG. 9. In FIGS. 7 through FIG. 9, it is assumed that the most retarded angle is 0 CA and the most advanced angle is 50 CA. FIGS. 7(a) through FIG. 9(a) show the chronological change of the actual displacement angle VT when the target displacement angle VTT is set to 35 CA.

FIG. 7(a) is an example of the chronological change of the actual displacement angle VT under normal circumstance, wherein the retardation fail flag XVTFR is not raised. FIG. 8(a), on the other hand, is an example of the chronological change of the actual displacement angle VT, wherein a failure occurred in the VVT 50 on the retarding side (approximately at 27.5 CA) at time tf1. It also assumes that the failure cannot be cancelled and continues to be judged to have a retardation angle abnormality even after force-driving the OCV (oil control valve) 80 six times.

FIG. 9(a) shows a case with a chronological change of the actual displacement angle VT when a failure occurred in the VVT 50 on the retarding side (approximately at 17.5 CA) at time tf2. It also assumes that the failure cannot be cancelled and continues to be judged to have a retardation angle abnormality even after force-driving the OCV 80 twice.

Let us also assume that a new VVT control process was started at time t0. FIGS. 7(b) through FIG. 9(b) show the chronological count change of the Duration Time Counter CVTER, while FIGS. 7(c) through FIG. 9(c) show the chronological count change of the Stop Time Counter CVTSTP, indicating that the larger the vertical axis values, the longer the elapsed times. FIGS. 7(g) through FIG. 9(g) show the outlines of the VVT control timings, while the FIGS. 7(h) through FIG. 9(h) show the outlines of the abnormality detection timings.

In FIG. 8, the Stop Time Counter CVTSTP is reset to "0" at time t1, and the retardation fail flag XVTFR is raised at time t2, which is 5 seconds after the time t1. The force-driving of the OCV 80 is initiated at this time, and a judgment is made at step S90 shown in FIG. 4 whether the force-driving of the OCV 80 has been conducted six times. If the force driving of the OCV 80 has been done more than six times, the control goes to the next step S100. On the other hand, if the force-driving of the OCV 80 has not been done more than six times, it goes to step S160 shown in FIG. 5.

Figure 10:
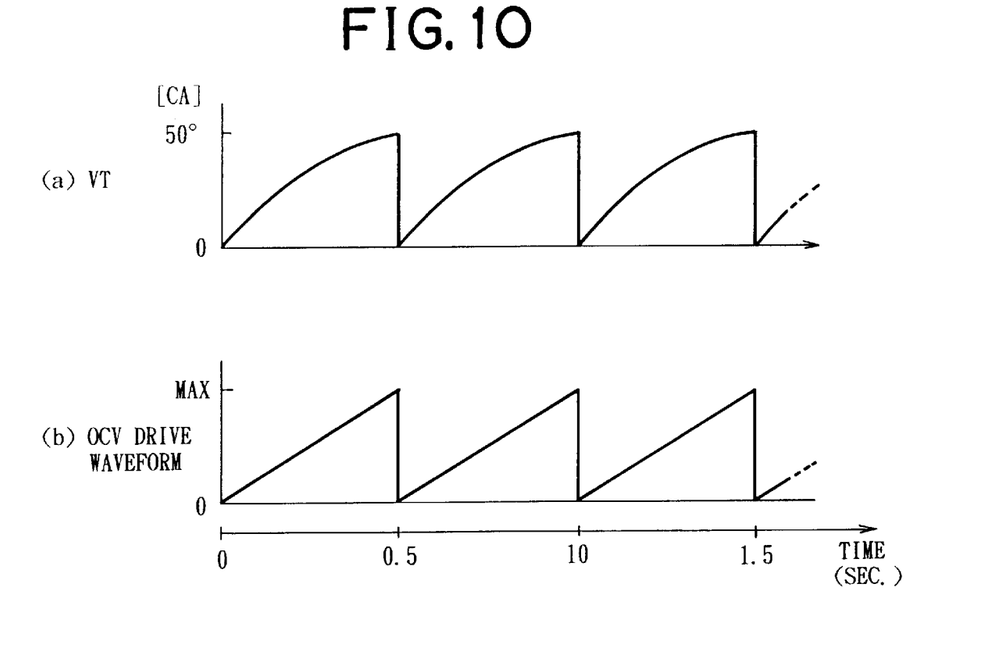
FIG. 10 is an explanatory diagram showing forced driving of an oil control valve and valve timing.

Let us now explain about the force driving of the OCV 80 referring to FIG. 10. The force-driving of the OCV 80 is to apply the OCV drive waveform such as the one shown in FIG. 10(b) to the electromagnetic actuator 81 at every 0.5 seconds. In the format of this embodiment, the OCV drive waveform is applied to the electromagnetic actuator 81 six times in a row. If the VVT 50 is operating properly, it can displace the actual displacement angle VT up to, for example, 50 CA to follow the OCV drive waveform as shown in FIG. 10(a).

On the other hand, if any abnormality occurs in the VVT 50 that cannot be cancelled with the force-driving of the OCV 80, the actual displacement angle VT does not vary even if the OCV drive waveform is applied to the electromagnetic actuator 81. The actual displacement angle VT and the chronological change of the OCV drive waveform are shown in FIG. 8(a) and FIG. 8(e) for times t2 and t3.

In step S100 shown in FIG. 4, similar to step S300 shown in FIG. 6, a judgment is made whether the following inequalities hold:

(3-1) CVTER ≧5 sec., and (3-2) CVTSTP≧5 sec.

Only when both formulas (3-1) and (3-2) are satisfied at step S100, i.e., the Duration Time Counter CVTER and Stop Time Counter CVTSTP are both more than 5 seconds, the control moves to step S110 to judge that a retardation abnormality exists and to raise a retardation abnormality flag at t3 as shown in FIG. 8(f). Based on the retardation abnormality flag, the outside world will be notified of an abnormality in the VVT 50 by means of turning on a warning lamp (not shown), etc.

The reason that the fail flag condition is reconfirmed at steps S70 and S100 is that, when the Duration Time Counter CVTER is reset due to changes of the target displacement angle VTT, etc., the current situation can be a dead zone, i.e., the existence of a failure can neither be confirmed nor denied, although a fail flag (either an advancement fail flag XVTFA or retardation fail flag XVTFR) was once established. The fail flag resetting is again done only with the resetting of the Stop Time Counter CVTSTP as mentioned before. By reconfirming the fail flag condition this way, the reliability of the abnormality judgment increases.

Similarly, when an advancement fail flag XVTFA is raised, the control judges an advancement abnormality judgment and raises an advancement abnormality flag at step S80 and, based on the advancement abnormality flag, the outside world will be notified of an abnormality in the VVT 50 by means of turning on a warning lamp (not shown), etc. The control then moves on step S160 shown in FIG. 5.

On the other hand, if it returns to normal by force-driving the OCV 80 at step S60 or step S90, it occurs as follows.

Let us explain a case where a condition with a retardation failure returns to normal by force-driving of the OCV 80 referring to FIG. 9.

As we described before, let us assume that a failure occurs at the VVT 50 on the retarding side (approximately at 17.5 CA) at time tf2 shown in FIG. 9(a). A typical failure is, for example, caused by metal chips generated during the manufacture of the VVT 50 move to the OCV 80 in the course of the oil circulation of the VVT 50 and get caught in the OCV 80 to prevent its spool 84 from moving freely.

In such a case, the Stop Time Counter CVTSTP is reset to "0" at time t1, a fail flag XVTFR is raised at time t2 after 5 seconds from t1 (FIG. 9(d)), and the force-driving of the OCV 80 begins at the same time t2. Let us assume that the failure at the VVT 50 is removed at time t3 when the force-driving of the OCV 80 has just about been completed twice, bringing the VVT 50 to a normal condition at time t3 and resetting the retardation fail flag XVTFR to "0." Thus, it neither judges that there is a retardation abnormality nor raises a retardation abnormality flag, so that a new VVT control process starts again at time t3. This is because the metal chips that had been preventing the motion of the spool 84 were removed from the OCV 80 as a result of force-driving it, thus canceling the failure condition of the OCV 80.

In other words, it means that it is possible to reconfirm an abnormality of the VVT 50 by force-driving the OCV 80 when a fail flag is raised; the force-driving is further capable of removing the cause of the failure as well.

Steps S120 through S150 shown in FIG. 5 represent a case where no fail flag is raised at step S40 shown in FIG. 4, wherein the control determines that the VVT 50 is operating normally at step 150 if all the conditions of steps S120 through S140 are met.

At step S120, it determines whether the absolute value of the difference between the angle VT0 and the angle vt0m exceeds 5 CA. The angle VT0 is updated (step S510) with the actual displacement angle VT each time the actual displacement angle VT displaces more than 5 CA (S500) as shown in steps S500 and S510 of FIG. 11 (hereinafter called the "Updated Actual Displacement Angle VT0").

Figure 11:
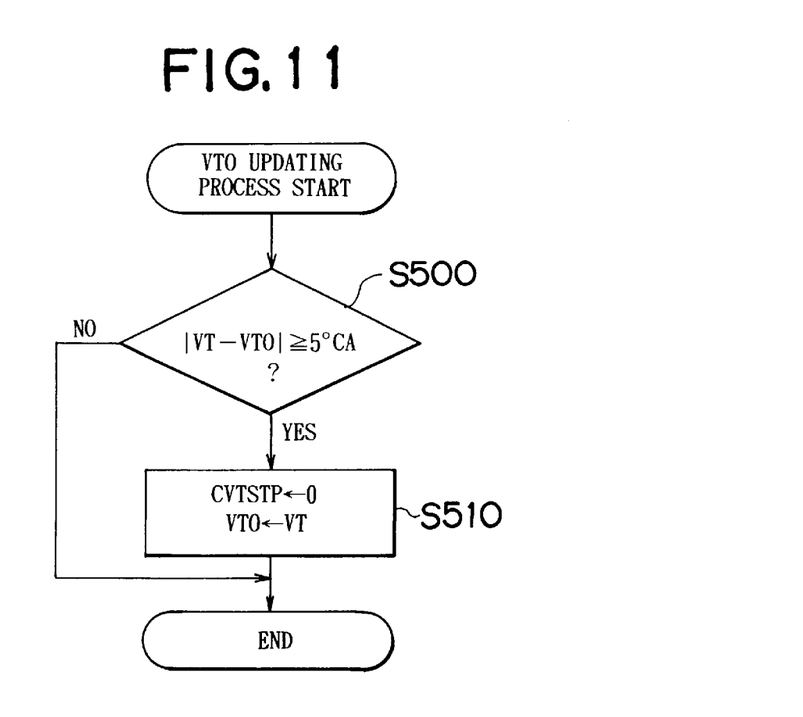
FIG. 11 is a flow chart showing a procedural sequence for updating VT0.

The "VT0 updating process" shown in FIG. 11 is executed in the VVT control process program executed by the CPU 72. If the VVT control process program is executed as a timed interruption process after each 180 CA, the "VT0 updating process" will also be executed as a timed interruption process after each 180 CA; for example, it will be executed with an interruption frequency of approximately 20 ms (1) when the engine RPM is running, for example, at 1500 rpm. In addition to the above-mentioned updating of the VT0, this "VT0 updating process" further conducts the aforementioned "0-setting" of the Stop Time Counter CVTSTP at step S510 shown in FIG. 11.

Figure 12:
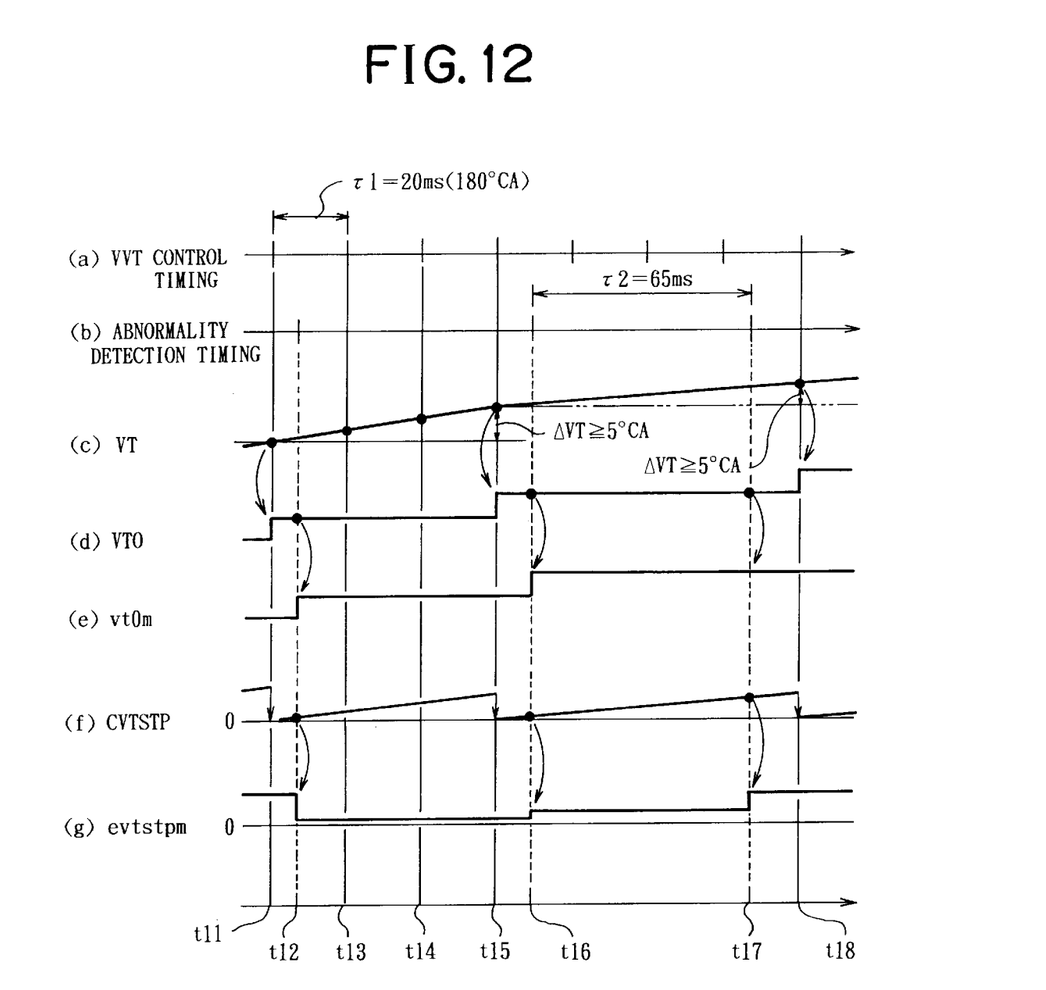
FIG. 12 is a timing chart showing an operating aspect of the present invention.

The chronological changes of the above-mentioned actual displacement angle VT and the Updated Actual Displacement Angle VT0 are shown in FIG. 12(c) and FIG. 12(d). The updating of the Updated Actual Displacement Angle VT0 is conducted synchronized with the specified VVT control timing as shown in FIG. 12(a). Referring to the time chart of FIG. 12, the updating timings are t11, t15 and t18, which are also the VVT control timings as shown in FIG. 12(a).

The aforementioned angle vt0m is updated with the updated actual angle VT0 as shown in step S160 of FIG. 5 and FIG. 12(e) at the abnormality detection timing (2) (hereinafter called the "Converted Actual Displacement Angle vt0m").

In other words, step S120 is to detect the displacement VT of the actual displacement angle, which is detected at the VVT control timing, at the abnormality detection timing, so that the detected displacement VT is not different in quantity despite the timing difference.

If the Updated Actual Displacement Angle VT0 and the displacements VT of the Converted Actual Displacement Angle vt0m are judged to be both greater than 5 CA at step S120, the control moves to step S130; if the displacement VT of the updated displacement angle VT0 and the Converted Actual Displacement Angle vt0m are less than 5 CA, the control moves to step S160.

At step S130, a judgment is made in regard to whether a time CVTSTP is less than 5 seconds. The time CVTSTP is when, as shown in step S160 and the FIG. 12(f) and FIG. 12(g), the value of the Stop Time Counter CVTSTP is updated at each abnormality detection timing (2) shown in FIG. 12(b) (hereinafter called the "Updated Stop Timing Counter CVTSTP"). This Updated Stop Timing Counter CVTSTP is a numerical counter similar to the Stop Time Counter CVTSTP but is treated as if the value is converted to time. The Updated Stop Time Counter CVTSTP converts the Stop Time Counter CVTSTP of the VVT control timing to the abnormality detection timing similar to the aforementioned Converted Actual Displacement Angle vt0m.

If the Updated Time Counter CVTSTP is judged to be less than 5 seconds at this step S130, the control moves to step S140; if the Updated Time Counter CVTSTP is judged to be larger than 5 seconds, it goes to step S160.

At step S140, it is judged whether more than 3 seconds has elapsed since the engine has started. If it has been more than 3 seconds from the engine start up, it moves to step S150 where a normalcy judgment is conducted; if it has been less than 3 seconds, it moves to step S160. The reason this step S140 is provided is so that any transient instability of the VVT 50 at the engine start up can be eliminated from the judgment.

At step S160, the Converted Actual Displacement Angle vt0m and the Updated Stop Time Counter CVTSTP are updated. In reference to the time chart shown in FIG. 12, these updates are made at times t12, t16 and t17, which are the abnormality detection timings shown in FIG. 12(b). If the control has arrived at step S160 directly from steps S120, S130 and S140, only the updating of the Converted Actual Displacement Angle vt0m and the Updated Stop Time Counter CVTSTP are conducted at this "VVT abnormality detection process" without making any judgments on the abnormality and normality. The above process is repeated every 65 ms.

The effects achieved by the embodiment format described above are as follows:

In one form of this embodiment, when a failure occurs in the VVT 50 and an advancing flag XVTFA or a retarding fail flag XVTFR is raised, a judgment of the abnormality of the VVT 50 is made after its failure is reconfirmed by force-driving the OCV 80. Therefore, it is not only possible to provide a more reliable method of abnormality detection in a valve timing control apparatus but also possible to remove the failure of the valve timing control apparatus by force-driving the OCV 80.

In another form of the embodiment, the failure judgment of the VVT 50 is conducted based on the count times of the Duration Time Counter CVTER and the Stop Time Counter CVTSTP. Therefore, it is possible to avoid erroneously making a judgment that a failure is occurring in the VVT 50 despite the fact that the actual displacement angle VT is displacing in an early stage where the deviation between the target displacement angle VTT and the actual displacement angle VT is large; this assures a more reliable abnormality detection in a valve timing control apparatus.

The embodiment can also be realized by reforming as follows:

Although the absolute value of the deviation between the target displacement angle VTT and the actual displacement angle VT was proposed as 5 CA in the embodiment described above, it doesn't have to be bound to that specific value. The absolute value of the deviation can be 4 CA, 6 CA, etc.

Although the absolute value of the displacement VT of the actual displacement angle VT was proposed as 5 CA in the embodiment described above, it doesn't have to be bound to that specific value. The absolute value of the displacement VT can be 3 CA, 4 CA, 6 CA, etc.

Although the count times of the Duration Time Counter CVTER and the Stop Time Counter CVTSTP was proposed as 5 seconds in the embodiment described above, it doesn't have to be bound to that specific value. The count times can be 3,4,6 seconds, etc. Moreover, the count time for the Duration Time Counter CVTER can be different from that of the Stop Time Counter CVTSTP.

Although the number of repetition of the force-driving of the OCV 80 was proposed as six times in the embodiment described above, it doesn't have to be bound to that specific value.

Although the force-driving of the OCV 80 was proposed to be conducted after the raising of a fail flag, i.e., after the confirmation of a fail flag in the embodiment described above, it doesn't have to be bound to that format. For example, it can be performed before step S30 in FIG. 4.

Although the use of helical splines was proposed for the VVT 50, the VVT 50 can be a vane type VVT using vanes.

Although it was proposed to change the valve overlap period by means of variably controlling the valve timing of the intake valve 21 in the embodiment described above, the same effect can be achieved by variably controlling the valve timing of the exhaust vale 31, or variably controlling the valve timings of the intake valve 21 and exhaust valve 31.

The above embodiments eliminate the possibility of judging the abnormalities that can be eliminated by force-driving the oil control valve as abnormalities of a valve timing control apparatus. Therefore, they provide a more reliable means of detecting abnormalities of a valve timing control apparatus. Also, if it is judged that an abnormality occurred in a valve timing control apparatus, the abnormality judgment can be reconfirmed by force-driving the oil control valve, thus providing a more reliable means of detecting abnormalities of a valve timing control apparatus. Moreover, by adding the duration time as a part of the abnormality detection conditions, the chance of erroneous detection of abnormalities can be avoided, thus providing a more reliable means of detecting abnormalities of a valve timing control apparatus.

What is claimed is:

1. An apparatus for detecting abnormalities in a valve timing control apparatus comprising:

a variable valve timing control mechanism that controls a valve timing of an internal combustion engine through a controlled supply of oil via an oil control valve;

means for detecting deviation between a target valve timing and an actual valve timing;

means for detecting an amount of change of the actual valve timing;

means for force-driving the oil control valve; and means for judging that an abnormality has occurred in the valve timing control apparatus based on detection, after the oil control valve has been force driven, of an abnormal deviation between the target valve timing and the actual valve timing and an abnormal amount of change of the actual valve timing.

2. An apparatus according to claim 1, wherein the judging means judges that the deviation detected between the target valve timing and the actual valve timing is abnormal when the deviation remains larger than a predetermined value for a predetermined length of time.

3. An apparatus according to claim 1, wherein the judging means judges that the change amount is abnormal when the change amount remains less than a predetermined value for a predetermined length of time.

4. An apparatus according to claim 1, wherein the judging means judges that the deviation is abnormal when the deviation detected between the target valve timing and the actual valve timing remains larger than a predetermined value for a predetermined length of time and the judging means judges that the change amount is abnormal when the change amount remains less than a predetermined value for a predetermined length of time.

5. An apparatus according to claim 1, wherein the force-driving means force-drives the oil control valve, when both the deviation the change amount are abnormal.

6. An apparatus according to claim 5, wherein the judging means judges that the deviation is abnormal when the deviation remains larger than a predetermined value for a predetermined length of time.

7. An apparatus according to claim 5, wherein the judging means judges that the change amount is abnormal when the change amount remains less than a predetermined value for a predetermined length of time.

8. An apparatus according to claim 5, wherein the judging means judges that the deviation is abnormal when the deviation remains larger than a predetermined value for a predetermined length of time and the judging means judges that the change amount is abnormal when the change amount remains less than a predetermined value for a predetermined length of time.

9. An apparatus for detecting abnormalities in a valve timing control apparatus comprising:

a variable valve timing control mechanism that controls a valve timing of an internal combustion engine through a controlled flow of oil via an oil control valve;

means for detecting a deviation between a target valve timing and an actual valve timing;

means for detecting an amount of change of the actual valve timing, first judging means for judging whether an abnormality has occurred in the valve timing control apparatus based on detection of an abnormal deviation and based on detection of an abnormal change amount; and means for force-driving the oil control valve, when the first judging means judges that an abnormality of the valve timing control apparatus has occurred.

10. An apparatus according to claim 9, further comprising second judging means for judging that an abnormality has occurred in the valve timing control apparatus when, after force-driving the oil control valve, both the deviation and the change amount are judged to be abnormal.

11. An apparatus according to claim 9, wherein the first judging means judges that the deviation is abnormal when the deviation detected remains larger than a predetermined value for a predetermined length of time.

12. An apparatus according to claim 9, wherein the first judging means judges that the change amount is abnormal when the change amount remains less than a predetermined value for a predetermined length of time.

13. An apparatus according to claim 9, wherein the first judging means judges that the deviation is abnormal when the deviation remains larger than a predetermined value for a predetermined length of time, and judges that the change amount is abnormal when the change amount remains less than a predetermined value for a predetermined length of time.

14. An apparatus for detecting abnormalities of a valve timing control apparatus comprising:

a variable valve timing control mechanism that controls valve timing of an internal combustion engine through the controlled flow of oil via an oil control valve;

means for detecting a deviation between a target valve timing and an actual valve timing;

means for detecting an amount of change of the actual valve timing;

means for tentatively judging that an abnormality exists in the valve timing control apparatus when both the deviation and the change amount are judged to be abnormal;

means for force-driving the oil control valve when an abnormality of the valve timing control apparatus is tentatively judged to exist; and means for finally judging that an abnormality exists in the valve timing control apparatus when both the deviation and the change amount are abnormal after the oil control valve has been force-driven.

15. An apparatus according to claim 14, wherein at least one of the tentative judging means and the final judging means judges that the deviation is abnormal when the deviation remains larger than a predetermined value for a predetermined length of time.

16. An apparatus according to claim 14, wherein at least one of the tentative judging means and the final judging means judges that the change amount is abnormal when the change amount remains less than a predetermined value for a predetermined length of time.

17. An apparatus according to claim 14, wherein at least one of the tentative judging means and the final judging means judges that the deviation is abnormal when the deviation remains larger than a predetermined value for a predetermined length of time, and judges that the change amount is abnormal when the change amount remains less than a predetermined value for a predetermined length of time.

* * * * *